Patented Sept. 7, 1937

2,092,228

UNITED STATES PATENT OFFICE 2,092,228

PLASTIC FLOOR COVERING COMPOSITION

Carl Joel Svensson, Hedvigsborg, Boras, Sweden, assignor, by mesne assignments, to Arvid Pelin, Hedvigsborg, Boras, Sweden No Drawing. Application June 6, 1936, Serial No. 84,008. In Sweden September 12, 1935

7 Claims. (Cl. 106—7)

The floor and wall covering masses sold on the market have the drawback that they cannot be kept in a plastic state but must be stored and sold as dry powder, which must be mixed at the place of consumption and be spread within the next few hours after the mixing since the setting will otherwise take place before it has been possible to apply the mass. Furthermore, after the setting, the surfaces of such known masses become more or less rough and part of the material is detached, due to which they must be subjected to a special superficial treatment, such as polishing, or be oiled or be coated with other covering substances. These superficial treatments, however, are not durable but they have to be renewed now and then.

The present invention relates to a mass for producing floor or wall coverings, which may be kept in a plastic state, so that immediately before the spreading of them at the place of consumption only a solidifying agent need be added, and it has such properties that the surface remains tough and keeps itself in repair, so that the surface once prepared remains in the intended condition without forming dust or being otherwise damaged.

The invention also relates to a method of preparing the mass.

According to the invention pure or practically pure cellulose, in the form of cellulose wadding, is mixed with paraffin oil, and thereby a new product is obtained, which is then used as initial material for further treatment. By a suitable treatment of this product with a solution of chloride of magnesium, a plastic mass is obtained, which may be kept for a practically unlimited length of time without any steps whatever being taken. To the said plastic mass a solidifying agent, preferably magnesite, is then added immediately before the mass is spread at the place of consumption, after which the mass is left to set. Before the setting has reached a certain limit, the mass is made plain, preferably by means of a sickle of steel, after which the covering is ready; it then has an appearance of fine gloss.

To improve the appearance of the covering coloring substances may be intermingled with the mass so that a marbled appearance is obtained.

The cellulose wadding used should be of a chemically pure and high-bleached kind.

The solution of magnesium chloride, with which the paraffine soaked cellulose is treated, should have a specific gravity of between 1.1 and 1.2. Its density is adapted to the atmospheric temperature, in which the subsequent treatment is effected, so that the setting after the spreading takes place at a suitable rate.

The plastic mass, which is obtained when the fat-soaked cellulose is treated with a solution of magnesium chloride, may be stored in order to be used when necessary but it is also possible to use the mass immediately after the preparation. When using it pulverized magnesite is added in a suitable proportion and the mass is worked until a homogeneous plastic pulp has been obtained, which is spread over the surface to be covered.

The desired coloring substances are added preferably after the magnesite has been added, immediately before the mass is spread over the surface.

The addition of fat is adapted to the circumstances and to the kind of fatty substances that has been chosen. If boiled linseed oil is used a smaller quantity is necessary than if paraffin oil is used.

According to a suitable modification of the invention 1 kg. of highly bleached pure cellulose wadding is mixed in a machine with 1 to 4 litres of boiled linseed oil until a homogeneous mass is formed. Then about 7 litres of water or solution of chloride are added and the mass is worked until a homogeneous, plastic pulp is obtained, which is a half-finished product, which may be stored in order to be used when needed. When using the said mass about 3 to 6 kgs. of pulverized magnesite are intermingled according to the desired degree of hardness.

Experience has shown that a covering mass produced in accordance with the present invention not only has the above stated properties of storing possibilities and absence of the necessity of keeping it in repair, but it also is very tough and resistant to mechanical stresses. For example, it is possible to subject a surface, which is covered with a layer of the said mass of about 1 cm. thickness, to considerable bending without any cracks or other superficial changes occurring. It has also proved possible to spread the mass over the outsides of buildings, and, if a suitable coloring substance is added to the mass, the same will compensate for oil paints with the advantage over the latter that it is a durable protection against atmospheric and other influences on the buildings.

The mass concerned is suitable for many different building purposes, such as the covering of all kinds of floors and walls, and also for steps, boarded window-sills etc. On account of the toughness and durable gloss of the surface the mass is an excellent building material, which is resistant to blows and to tearing, and moreover the absence of joints gives both considerable hygienic and aesthetic advantage to rooms the walls or floors of which have been covered with the mass in question.

The invention does not relate only to the producing of coverings on floors or walls by spreading the mass to which a solidifying agent has been added. The said mass may also be advantageously used for producing parquetry flooring strips, building plates and other objects, in which case the mass is either applied to a base or is formed in a press.

Having now described my invention, what I claim as new and desire to secure by Letters Patent is:

1. An improved floor covering composition comprising chloride of magnesium, substantially pure cellulose wadding, liquid paraffine oil and burnt magnesite.

2. An improved floor covering composition comprising an emulsion of a solution of chloride of magnesium, liquid paraffine oil and burnt magnesite, said emulsion comprising substantially pure cellulose wadding intermingled as emulsifier.

3. An improved floor covering composition comprising an emulsion of a solution of chloride of magnesium and liquid paraffine oil in which emulsion substantially pure cellulose wadding serves as emulsifier, and burnt magnesite.

4. An improved floor covering composition comprising chloride of magnesium thoroughly intermingled with substantially pure cellulose wadding, liquid paraffine oil, and burnt magnesite.

5. An improved floor covering composition comprising substantially pure cellulose wadding soaked in a solution of chloride of magnesium intermingled with liquid paraffine oil, and burnt magnesite added thereto.

6. An improved floor covering composition comprising substantially pure cellulose wadding, chloride of magnesium, liquid paraffine oil and burnt magnesite, having a coloring substance intermingled in the mass.

7. An improved floor covering comprising a hardened composition of chloride of magnesium and substantially pure cellulose wadding, liquid paraffine oil intimately intermingled therewith, as well as coloring substances, and burnt magnesite as a solidifying means, said covering having a tough, dust-proof, self-maintaining surface.

CARL JOEL SVENSSON.